UNITED STATES PATENT OFFICE.

THOMAS LEOPOLD WILLSON AND MAXIMILIAN MATTHEUS HAFF, OF OTTAWA, ONTARIO, CANADA, ASSIGNORS, BY DIRECT AND MESNE ASSIGNMENTS, TO SOUTHERN INVESTMENT CO. OF CANADA LTD., OF MONTREAL, CANADA, A CORPORATION OF CANADA.

FERTILIZER.

1,146,222.      Specification of Letters Patent.      Patented July 13, 1915.

No Drawing.      Application filed August 18, 1913. Serial No. 785,270.

*To all whom it may concern:*

Be it known that we, THOMAS LEOPOLD WILLSON and MAXIMILIAN MATTHEUS HAFF, both subjects of the King of Great Britain, and residents of Ottawa, in the Province of Ontario, Dominion of Canada, have invented certain new and useful Improvements in Fertilizers, of which the following is the specification.

This invention relates to an improved fertilizer and the objects of the invention are to produce a dry phosphate fertilizer having a suitable amount of ammonia fixed therein.

We have discovered that if in the ordinary manufacture of double superphosphate the ordinary ortho-phosphoric acid of commerce be replaced in part or wholly by pyro-phosphoric acid, then when the acid is added to natural or bone phosphate a new and naturally dry product may be obtained, and the apparent solvent action of the acid is materially increased.

The solution of pyro-phophoric acid for the process may be produced by boiling ordinary phosphoric acid to a temperature of from 209 to 220 degrees centigrade. It may also be produced directly by heating natural phosphate rock with silicious material in the electric furnace. The phosphoric acid expelled from the furnace when absorbed in water is a mixture of the meta, pyro, and ortho varieties; and it may be necessary to boil a solution of it to bring it to the pyro state.

In carrying out the process in practice a solution containing pyro-phosphoric acid, however obtained, is brought to a specific gravity of about 1.5 and added to natural phosphate rock, and mixed therewith in suitable proportions to produce double superphosphate in the manner at present carried out with ordinary commercial phosphoric acid.

It will be found that the mixture of natural phosphate with the pyro-phosphoric acid will quickly "set" in a cake like plaster which may readily be broken or disintegrated. This phenomenon of "setting" is believed to be quite new in this process as commercially carried out and indicates that the double superphosphate product produced is inherently or naturally dry. This natural dryness which is not lost by exposure, renders the new product very useful as a fertilizer, and gives it the important advantage over ordinary double superphosphate that it is not necessary to artificially dry it prior to use as a fertilizer.

In further accordance with the present invention, the naturally dry and set product produced by the process just described is ammoniated by introducing ammonia in the form of gas which ammonia will be found to combine with the monocalcic phosphate to produce an ammonium monocalcic phosphate which is a valuable fertilizer.

The ammonia is introduced in quantities greater than would be sufficient to neutralize the free acid in the superphosphate product so that the desired quantities of ammonia will remain combined in the mass. Usually 10 to 15% of ammonia as vapor is sufficient.

The term "set" employed herein as applied to double superphosphate is used to describe a double superphosphate which in the process of manufacture has been set like plaster, and is therefore naturally dry.

While it has been stated that a solution of pyro-phosphoric acid is used in the process, this term is to be understood to include a solution which only partially consists of pyro-phosphoric acid and which may contain the ortho or meta varieties as well.

What we claim as our invention is:

1. As a new article of manufacture, a substantially dry fertilizer composition containing naturally dry double superphosphate, a little ammonium phosphate and containing no free acid.

2. As a new article of manufacture, naturally dry double superphosphate comprising ground phosphate rock having pyro phosphoric acid and ammonia combined therein.

In witness whereof we have hereunto set our hands in the presence of two witnesses.

THOMAS LEOPOLD WILLSON.
MAXIMILIAN MATTHEUS HAFF.

Witnesses:
RUSSEL S. SMART,
O. C. A. RAYE.